(12) United States Patent
Kamikawa et al.

(10) Patent No.: US 7,333,769 B2
(45) Date of Patent: Feb. 19, 2008

(54) LEARNING SUPPORT METHOD THAT UPDATES AND TRANSMITS LEARNER UNDERSTANDING LEVELS

(75) Inventors: Shunichi Kamikawa, Kawasaki (JP); Hiroshi Kuzumaki, Ota (JP); Keiko Chida, Ota (JP); Ryusuke Momose, Ota (JP)

(73) Assignee: Fujitsu Limited, Kawasaki (JP)

( * ) Notice: Subject to any disclaimer, the term of this patent is extended or adjusted under 35 U.S.C. 154(b) by 172 days.

(21) Appl. No.: 10/282,131

(22) Filed: Oct. 29, 2002

(65) Prior Publication Data

US 2003/0165803 A1 Sep. 4, 2003

(30) Foreign Application Priority Data

Mar. 4, 2002 (JP) ............................. 2002-057011

(51) Int. Cl.
*G09B 3/00* (2006.01)

(52) U.S. Cl. ........................................ 434/350; 434/322

(58) Field of Classification Search ................ 434/118, 434/322, 350
See application file for complete search history.

(56) References Cited

U.S. PATENT DOCUMENTS

| | | | |
|---|---|---|---|
| 5,002,491 A * | 3/1991 | Abrahamson et al. ...... 434/322 |
| 5,273,437 A * | 12/1993 | Caldwell et al. ............ 434/351 |
| 5,727,950 A * | 3/1998 | Cook et al. ................. 434/350 |
| 5,967,793 A * | 10/1999 | Ho et al. ..................... 434/362 |
| 6,024,577 A * | 2/2000 | Wadahama et al. ......... 434/322 |
| 6,198,905 B1 * | 3/2001 | Remschel .................... 434/350 |
| 6,431,875 B1 * | 8/2002 | Elliott et al. ................ 434/322 |
| 6,554,618 B1 * | 4/2003 | Lockwood ................... 434/322 |
| 6,704,541 B1 * | 3/2004 | Ciarallo et al. ............. 434/362 |

\* cited by examiner

*Primary Examiner*—Xuan M. Thai
*Assistant Examiner*—Cameron Saadat
(74) *Attorney, Agent, or Firm*—Staas & Halsey LLP

(57) ABSTRACT

A client machine receives Web data including a learning material part from a learning server in an e-Learning center to display it as an Web page. The Web page includes a circle graph that represents the intelligibility of all learners who studied the learning material and a pair of bar graphs that represent the ratio of the achievers in the finishers who could not understand the learning material. A learner can make use of the status information represented by the graphs to his or her learning. After attending the learning material part, a learner clicks an "Understood" button or a "Not Understood" button to inform one's intelligibility to the learning server.

3 Claims, 8 Drawing Sheets

FIG. 2

<LEARNING MATERIAL DB 13>

| Learning Material Number | Learning Material Name | Chapter Number | Chapter Name | Section Number | Section Name | Item Number | Item Name | Learning Material Unit Number | Learning Material Entity |
|---|---|---|---|---|---|---|---|---|---|
| 2765 | Introduction To Network | 5 | TCP/IP | 3 | Relationship with Standard | 1 | Relationship with OSI 7th Layer Model | 2765-00-050301-00-02 | IP of TCP/IP corresponds to Network Layer of OSI 7th Model and TCP corresponds to Transport Layer... |

FIG. 3

<LEARNER DB 14>

| Learner Number | Learner Name | Learning Material Number | Lecture Identifying number (Learner number-Learning material number-Suffix) |
|---|---|---|---|
| 01-00367254 | Ii Learning | 2765 | 01-00367254-2765-00 |

FIG. 4

<LEARNING MANAGEMENT DB 15>

| Lecture Identifying Number | Start Date | Deadline | End Date | Final Test Result | Learning Material Unit Number | Score |
|---|---|---|---|---|---|---|
| 01-00367254-2765-00 | 2001.12.01 | 2002.02.28 | | | 2765-00-050301-00-02 | |
| | | | | | ... | |

FIG. 5

<LEARNING HISTORY DB 16>

| Lecture Identifying Number | Event Serial Number | Event ID | Event | Date and Time of Event | Learning Material Unit Number | Status |
|---|---|---|---|---|---|---|
| 01-00367254-2765-00 | 000013 | 0110 | "No Understand" button was clicked | 2001.12.05 13:43:08 | 2765-00-050301-00-02 | Keyword Selection Screen Image is currently displayed |
| 01-00367254-2765-00 | 000021 | 0140 | "Understand" button was clicked | 2001.12.05 14:10:17 | 2765-00-050402-00-02 | Go On |
| 01-00367254-2765-00 | 000023 | 0120 | "Mentor Call" button was clicked | 2001.12.05 14:15:21 | 2765-00-050403-00-02 | Calling up Mentor |

FIG.8

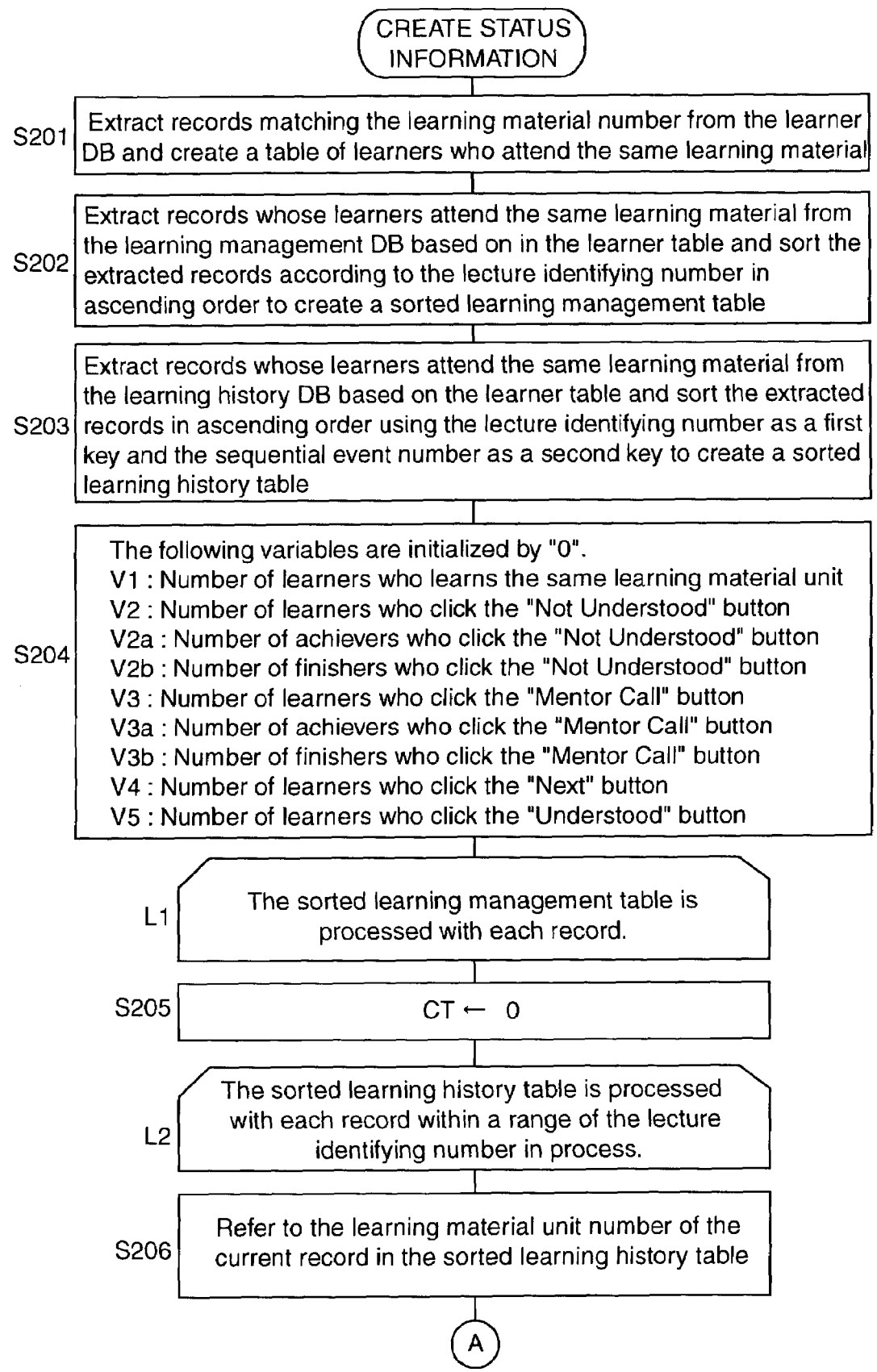

( CREATE STATUS INFORMATION )

S201: Extract records matching the learning material number from the learner DB and create a table of learners who attend the same learning material S202: Extract records whose learners attend the same learning material from the learning management DB based on in the learner table and sort the extracted records according to the lecture identifying number in ascending order to create a sorted learning management table S203: Extract records whose learners attend the same learning material from the learning history DB based on the learner table and sort the extracted records in ascending order using the lecture identifying number as a first key and the sequential event number as a second key to create a sorted learning history table S204: The following variables are initialized by "0".
V1 : Number of learners who learns the same learning material unit
V2 : Number of learners who click the "Not Understood" button
V2a : Number of achievers who click the "Not Understood" button
V2b : Number of finishers who click the "Not Understood" button
V3 : Number of learners who click the "Mentor Call" button
V3a : Number of achievers who click the "Mentor Call" button
V3b : Number of finishers who click the "Mentor Call" button
V4 : Number of learners who click the "Next" button
V5 : Number of learners who click the "Understood" button L1: The sorted learning management table is processed with each record.

S205: CT ← 0

L2: The sorted learning history table is processed with each record within a range of the lecture identifying number in process.

S206: Refer to the learning material unit number of the current record in the sorted learning history table (A)

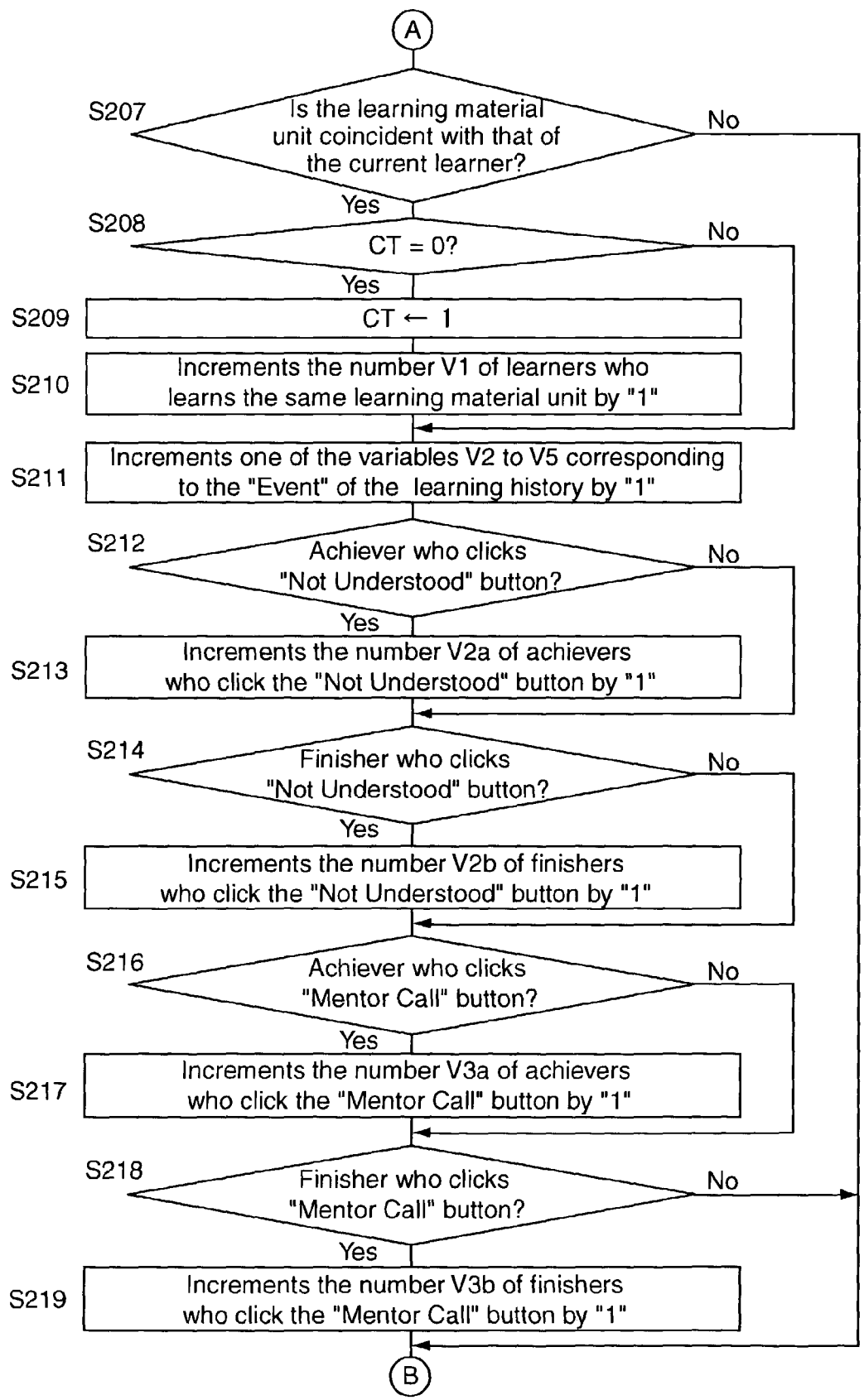

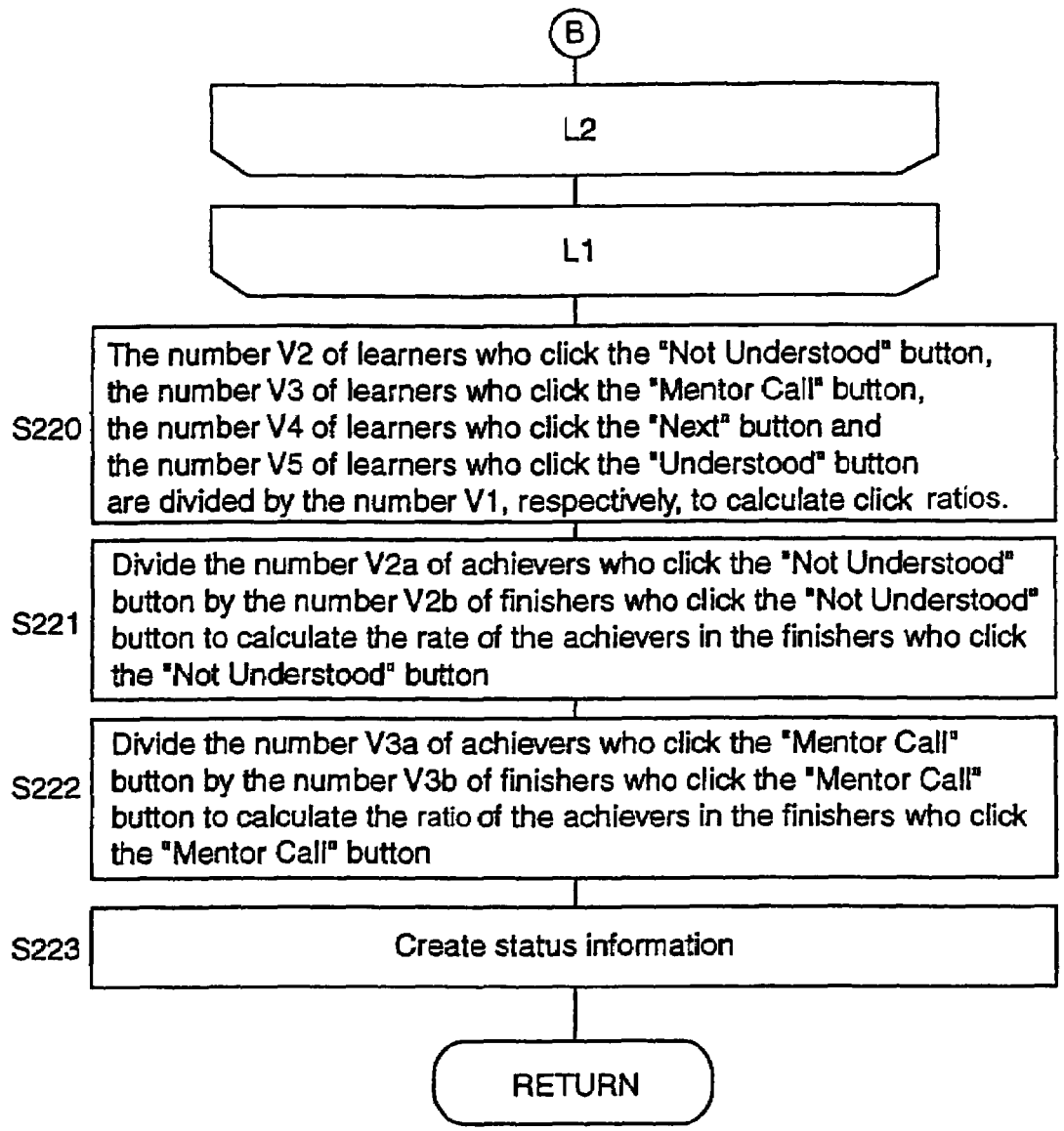

US 7,333,769 B2
1

LEARNING SUPPORT METHOD THAT UPDATES AND TRANSMITS LEARNER UNDERSTANDING LEVELS

BACKGROUND OF THE INVENTION

1. Field of the Invention

The present invention relates to a learning support method in so-called "e-Learning" system and particularly, to a learning support method to provide various information attendant on learning contents for a learner.

2. Prior Art

In late years the learning support system with a network and the World Wide Web technology has been developed. A learner (a student) is able to attend a lecture opened on the Web through an web browser. Accordingly, a learner can study in a desired time at a desired place without limitations of time and place.

However, unlike a classroom education, in which a plurality of learners gather on a classroom to attend a lecture, each learner has to study individually in the learning support system. Each learner feels a situation and an atmosphere in the classroom during a lecture according to the classroom education. On the other hand, a learner has to continue solitary works because he or she cannot grasp the situation of another learner.

Further, each learner gets the sense of intelligibility of the other learners through interactions between an instructor and other learners in the classroom education. Accordingly each learner can guess the difficulty level of contents of the lecture. That is, high intelligibility of most learners shows that the contents of the lecture are easy to understand. On the contrary, low intelligibility of most learners shows that the contents are difficult to understand. According to the intelligibility of the other learners, when a learner could not understand the lecture, he or she can determine whether he or she should try to continue because the lecture is easy or he or she should stop attending the lecture and attend a lecture of another level because the current lecture is too difficult. Further, an instructor can realize intelligibility and degree of concentrations of the learners through their facial expressions, behavior and an atmosphere of the classroom. Therefore, the instructor can improve the intelligibility by changing a way of explanation and so on.

On the other hand, a service offerer of a conventional learning support system grasps the intelligibility of the learners indirectly through test results and questions from the learners. However, a frequency of test is limited. Further it is difficult to know intelligibility of each learner based on contents of the questions because a question is a voluntary action of a learner. Since the learner who could not understand the contents of the lecture does not usually realize what point he or she could not understand, he or she cannot construct a question by analyzing an unknown portion. For example, a questioner who asks "what is corresponding to the session layer?" after the description "IP of TCP/IP corresponds to a network layer of OSI seven-layer model and TCP corresponds to a transport layer thereof" understands the contents of the description. On the contrary, a learner who does not know the OSI seven-layer model cannot ask questions about the description.

Further, in a classroom education, a learner does not exit from a classroom without saying a word even if he or she could not understand the contents of the lecture because he or she is attending the lecture with other learners in the classroom. However, in e-learning, a learner stops attending a lecture when he or she could not understand the contents of the lecture with or without frustration because he or she is not restrained in a classroom.

Accordingly, a repeat ratio, which is a ratio of repeaters who attend a lecture of the next step or other series after they finish the previous lectures, may be equal to or smaller than 10% in the conventional learning support systems.

SUMMARY OF THE INVENTION

It is therefore an object of the present invention to provide an improved learning support method, which is capable of grasping the learning situation of other learners.

For the above object, according to the present invention, there is provided a learning support method with an on-line computer that holds a learning material content and intelligibility information, which includes: a learning material transmitting step for transmitting the learning material content to client machines, a receiving step for receiving information representing intelligibility of learners about the learning material content, an updating step for updating the intelligibility information based on the information representing intelligibility received in the receiving step, and an intelligibility information transmitting step for transmitting the intelligibility information to the client machines.

With this method, a learner can grasp surrounding circumstance about the learning material in use and can continue learning efficiently. The learning material and information about intelligibility may be transmitted simultaneously or they may be transmitted separately.

DESCRIPTION OF THE ACCOMPANYING DRAWINGS

FIG. 2 is a table showing data layout of a learning material DB;

FIG. 3 is a table showing data layout of a learner DB;

FIG. 4 is a table showing data layout of a learning management DB;

FIG. 5 is a table showing data layout of a learning history DB;

FIG. 8, FIG. 9 and FIG. 10 are flowcharts showing a process for creating the status information.

DESCRIPTION OF THE PREFERRED EMBODIMENTS

Figure 1:
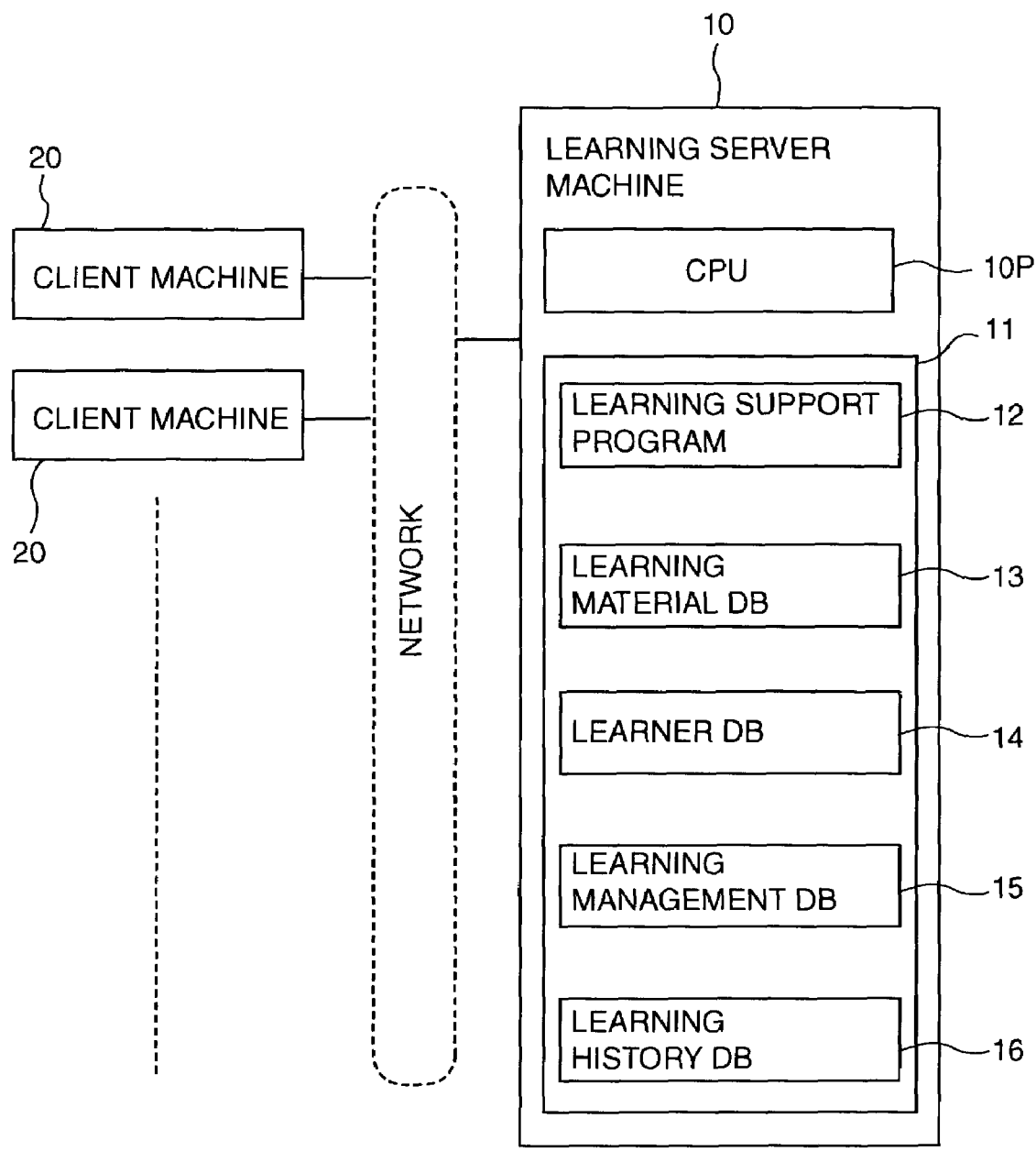
FIG. 1 is a block diagram showing the entire system of a learning support system of an embodiment according to the present invention.

An embodiment of the present invention will be described with reference to the drawings. FIG. 1 is a block diagram of the entire system including a learning server machine 10 of the embodiment. The learning server machine 10 is a server computer located in an e-learning center and it can connect to a plurality of client machines 20 through a network such as the Internet. Further the learning server machine 10 is provided with a CPU 10P and a memory portion 11 having a hard disk and a memory that are connected to the CPU 10P. A learning support program 12 is installed in the memory portion 11 and a learning material DB 13, a learner DB 14, a learning management DB 15 and a learning history DB 16 are also stored in the memory portion 11. The learning support program 12 includes a Web server program module, a program module of the server side and program modules for executing processes shown in FIGS. 7 to 10 described below.

For example, the client machine 20 consists of a personal computer in which a Web browser program is installed. A learner can attend a lecture supplied by the learning server machine 10 by accessing to the learning server machine 10 from a client machine 20. A leaning material supplied by the learning server machine 10 consists of a plurality of learning material units. For example, when contents of a learning material are arranged in a hierarchical format of "capter", "paragraph", "section" and "item", the learning material unit includes contents corresponding to the item. A learner who attends a lecture obtains a learning material corresponding to the lecture by the learning material unit in sequence to progress his or her learning. The learning materials are managed by the learning material DB 13 in the learning server machine 10.

FIG. 2 shows a data layout of learning material DB 13. The learning material DB 13 contains a plurality of records that are created for respective learning material units, and each record includes fields of "Learning Material Number", "Learning Material Name", "Chapter Number", "Chapter Name", "Section Number", "Section Name", "Item Number", "Item Name", "Learning Material Unit Number" and "Learning Material Entity".

A learning material number that is uniquely given for a learning material is stored in the "Learning Material Number" field. A learning material name of the material is stored in the "Learning Material Name" field. Number and name of a chapter in which the learning material unit corresponding to this record is contained are stored in the "Chapter Number" field and the "Chapter Name" field, respectively. Number and name of a section in which the learning material unit corresponding to this record is contained are stored in the "Section Number" field and the "Section Name" field, respectively. Number and name of an item corresponding to this record are stored in the "Item Number" field and the "Item Name" field, respectively. A learning material unit number that is uniquely given for a learning material unit corresponding to this record is stored in the "Learning Material Unit Number" field. The contents such as image data and text data of the learning material unit corresponding to this record are stored in the "Learning Material Entity" field.

FIG. 3 is a table showing a data layout of the learner DB 14. The learner DB 14 contains a plurality of records, and each record includes fields of "Learner Number", "Learner Name", "Learning Material Number" and "Lecture Identifying Number". A learner number that is uniquely given for a learner is stored in the "Learner Number" field. A learner name is stored in the "Learner Name" field. The number of the learning material of the learning course attended by the learner is stored in the "Learning Material Number" field. The lecture identifying number that is formed of the learner number, the learning material number and a suffix is stored in the "Lecture Identifying Number" field. The learner number and the learning material number are extracted from the lecture identifying number adversely. Namely, the learner and the learning material can be specified based on the lecture identifying number. Each record of the learner DB 14 uniquely corresponds to the lecture identifying number.

FIG. 4 is a table showing a data layout of the learning management DB 15. The learning management DB 15 contains a plurality of records that are created for the respective lecture identifying numbers, and each record includes fields of "Lecture Identifying Number", "Start Date", "Deadline", "End Date", "Final Test Result", "Learning Material Unit Number" and "Score".

A date when the learner identified by the lecture identifying number started to attend the lecture with the learning material (learning course) of the corresponding learning material number is stored in the "Start Date" field. A deadline date set to the learning course is stored in the "Deadline" field. A default of the "End Date" is NULL. When the learner finishes the learning course, the finished date is stored in the "End Date" field. A default of the "Final Test Result" is NULL. When the learner takes a final test and the result reaches a predetermined reference score, a code representing "achiever" is stored in the "Final Test Result" field. On the other hand, if the learner does not take the final test before the deadline or the score does not reach the reference score, a code representing "not-achieved" is stored in the "Final Test Result" field. A learner whose final test result is "not-achieved" only finished the learning, while a learner whose final test result is "achiever" completed the learning.

The learning material represented by the lecture identifying number consists of a plurality of learning material units as described above. One record of the learning management DB 15 contains a plurality of "Learning Materials Unit Number" fields and the "Score" fields corresponding to a plurality of learning materials. A unit number of the corresponding learning material unit is stored in the "Learning Material Unit Number" field. A test score is stored in the "Score" field when a test is set in the corresponding learning material unit.

FIG. 5 is a table showing a data layout of the learning history DB 16. The learning history DB 16 is a database to store a history of events detected during learning. Click of a button displayed on a Web page by a learner generates an event. When an event occurs while one learner is learning one learning material, the learning server machine 10 assigns a sequential event number to the event generated and creates a new record in the learning history DB 16 to store the content of the event with the sequential event number. The record is uniquely distinguished according to the lecture identifying number, which shows the learner number and the learning material number, and the sequential event number.

Figure 6:
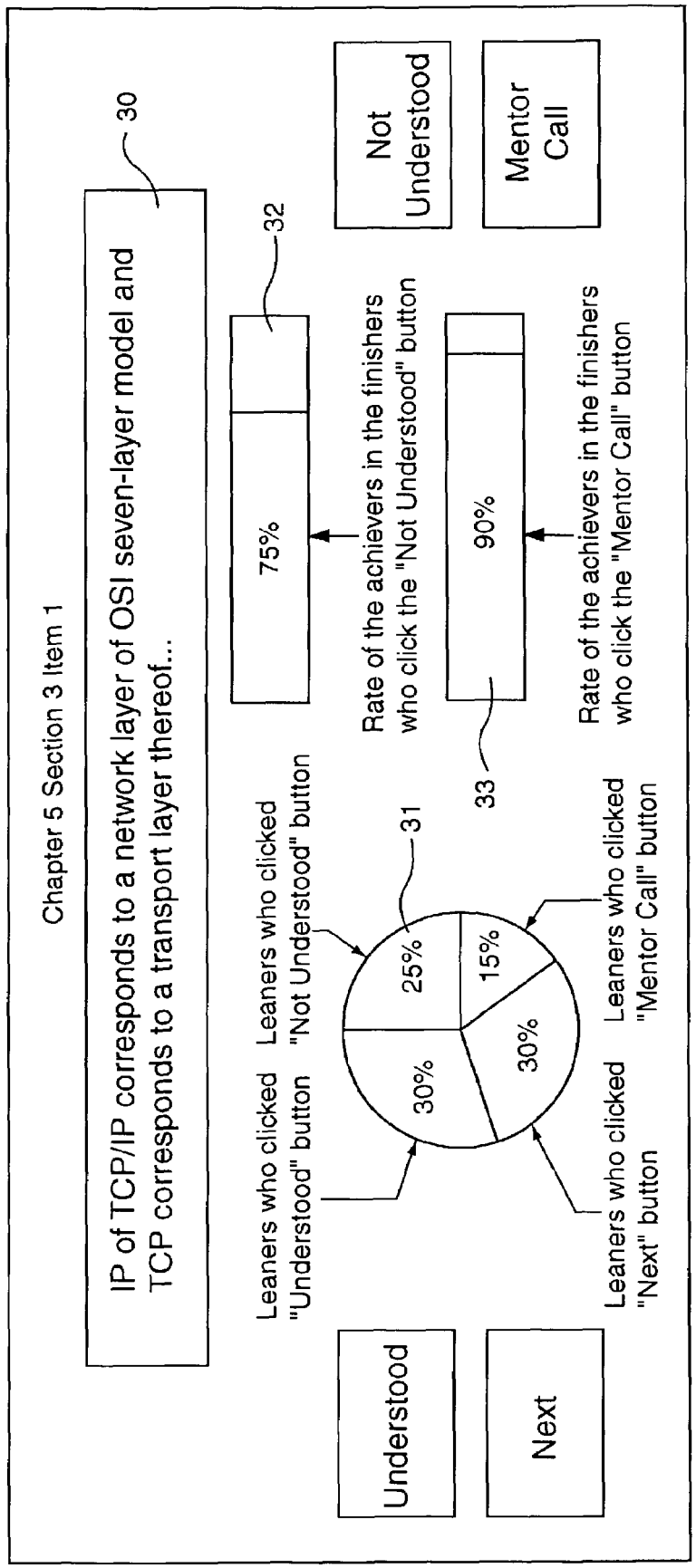
FIG. 6 shows a layout of an Web page including the learning material and status information.

As shown in FIG. 6, a plurality of buttons to search intelligibility of a learner are displayed on the learning Web page corresponding to one learning material unit. There are "Understood", "Next", "Mentor Call" and "Not Understood" buttons on the Web page.

A learner who understood the contents of the learning material unit clicks the "Understood" button on this Web page. When the "Understood" button is clicked, the learning server machine 10 finishes the process with respect to the present learning material unit and transfers the next learning material unit to the client machine 20 of the learner. On the other hand, a learner who could not understand the contents clicks the "Not Understood" button. When the "Not Understood" button is clicked, the learning server machine 10 transmits an explanation about contents that was not understood by the learner to the client machine 20 of the learner.

A learner is able to keep silent about his or her intelligibility and go on the next learning material unit by clicking the "Next" button without clicking the "Understood" button or the "Not Understood" button. Further, a learner who could not understand the contents can individually consult a mentor who takes charge of this learning course by clicking the "Mentor Call" button.

The click history of each button is stored as a record with the corresponding lecture identifying number and the sequential event number in the learning history DB 16. As shown in FIG. 5, each record of the learning history DB 16 contains fields of "Lecture Identifying Number", "Sequential Event Number", "Event ID", "Event", "Date and Time of Event", "Learning Material Unit Number" and "Status".

An event ID that is linked with a clicked button is stored in the "Event ID" field. Information showing the contents of the event occurred is stored in the "Event" field. Date and time when the event occurred are stored in the "Date and Time of Event" field. The number of the learning material unit that was learned by the learner at the time of the occurrence of the event is stored in the "Learning Material Unit Number" field. An actual condition of the executed process in connection with the event is stored in the "Status" field.

Hereinafter, a process executed when a learner attends one learning material unit will be described according to a flowchart of FIG. 7. At first, a learner operates the client machine 20 to notify the learning server machine 10 that he or she starts to attend one learning material unit (S1). Then the learning server machine 10 creates status information that shows intelligibility with respect to the present learning material unit based on the history of the other learners who attended the present learning material unit (S2).

Figure 7:
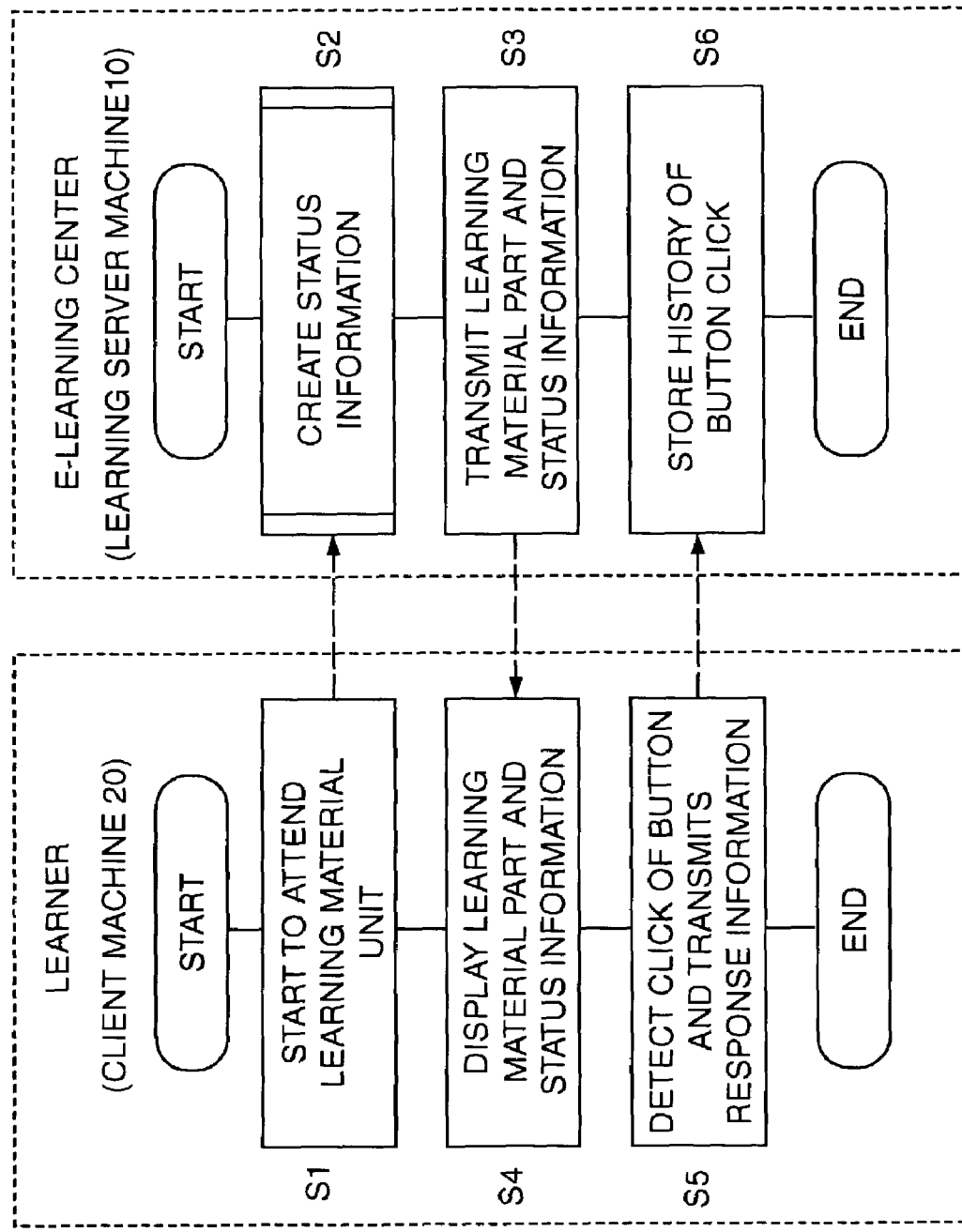
FIG. 7 is a flowchart showing process of the embodiment according to the present invention.

FIGS. 8 to 10 are flowcharts describing the subroutine process executed in S2 of FIG. 7 in detail. The process for creating the status information will be described in detail with reference to the flowcharts shown in FIGS. 8 to 10. The learning server machine 10 extracts records matching the learning material number of the learning material attended by the learner who made notification in S1 from the learner DB 14. Then the learning server machine 10 creates a table of learners who attend the same learning material (FIG. 8, S201). A record of the current learner is excluded within the table.

The learning server machine 10 extracts records whose learners are attending or attended the same learning material from the learning management DB 15 based on the lecture identifying number in the learner table created in S201. Then the learning server machine 10 sorts the extracted records in ascending order to create a sorted learning management table (S202). Further, the learning server machine 10 extracts records whose learners are attending or attended the same learning material from the learning history DB 16 based on the lecture identifying number in the learner table created in S201. Then the learning server machine 10 sorts the extracted records in ascending order using the lecture identifying number as a first key and the sequential event number as a second key to create a sorted learning history table (S203).

Next, the learning server machine 10 allocates the following variables and initializes the variables by storing "0" (S204).

V1: Number of learners who learns the same learning material unit,
V2: Number of learners who click the "Not Understood" button,
V2a: Number of achievers who click the "Not Understood" button,
V2b: Number of finishers who click the "Not Understood" button (including non-achiever),
V3: Number of learners who click the "Mentor Call" button,
V3a: Number of achievers who click the "Mentor Call" button,
V3b: Number of finishers who click the "Mentor Call" button (including non-achiever),
V4: Number of learners who click the "Next" button, and
V5: Number of learners who click the "Understood" button.

The learning server machine 10 processes the sorted learning management table created in S202 record by record. That is, it executes a first loop process L1 shown in FIGS. 8 to 10. At first in the first loop process, the learning server machine 10 stores "0" in a control flag CT dedicated in advance (S205). Then, the learning server machine 10 processes the sorted learning history table created in S203 record by record within a range of the lecture identifying number of the current record in the sorted learning management table. That is, it executes a second loop process L2 (S206 to S219).

While a record of the sorted learning management table uniquely corresponds to a lecture identifying number, there are a plurality of records corresponding to one lecture identifying number in the sorted learning history table. Accordingly, the second loop process L2 is repeated for the current lecture identifying number in the first loop process L1.

At first in the second loop process L2, the learning server machine 10 refers to the learning material unit number of the current record in the sorted learning history table (S206). Then the learning server machine 10 finishes the process with respect to the current record in the sorted learning history table when the learning material number referred in S206 is different from that of the learning material unit attended by the current learner (S207 of FIG. 9, No).

On the other hand, the learning server machine 10 causes the process to branch according to the condition of the flag CT (S208) when the learning material number referred in S206 is coincident with that of the learning material unit attended by the current learner (S207, Yes). Namely, if CT=0 (S208, Yes) the learning server machine 10 sets the flag CT at "1" (S209), increments the number V1 of learners who learns the same learning material unit by "1" (S210) and proceeds the process to S211. If CT=1 (S208, No), the learning server machine 10 directly proceeds the process to S211.

In S211, the learning server machine 10 increments one of the variables V2 to V5 corresponding to the "Event" of the current record of the sorted learning history table by "1." When the "Event" is a click of the "Not Understood" button, the server increments the number V2 of finishers who click the "Not Understood" button. In the same manner, a click of the "Mentor Call" button increments the number V3 of learners who click the "Mentor Call" button, a click of the "Next" button increments the number V4 of learners who click the "Next" button and a click of the "Understood" button increments the number V5 of learners who click the "Understood" button.

The learning server machine 10 increments the number V2a of achievers who click the "Not Understood" button by "1" (S213) when a code representing an achiever is stored in a field of "Final Test Result" of the current record in the sorted learning management table and the "Event" of the current record in the sorted learning history table is a click of the "Not Understood" button (S212, Yes).

On the other hand, for the other case (S212, No), the learning server machine 10 increments the number V2b of finishers who click the "Not Understood" button by "1" (S215) when a code representing not-achieved is stored in a field of "Final Test Result" of the current record in the sorted learning management table and the "Event" of the current record in the sorted learning history table is a click of the "Not Understood" button (S214, Yes).

On the other hand, for the other case (S214, No), the learning server machine 10 increments the number V3a of achievers who click the "Mentor Call" button by "1" (S217) when a code representing an achiever is stored in a field of "Final Test Result" of the current record in the sorted learning management table and the "Event" of the current record in the sorted learning history table is a click of the "Mentor Call" button (S216, Yes).

On the other hand, for the other case (S216, No), the learning server machine 10 increments the number V3b of finishers who click the "Mentor Call" button (S219) and finishes the process with respect to the current record in the sorted learning history table, when a code representing an achiever or a non-achiever is stored in a field of "Final Test Result" of the current record in the sorted learning management table and the "Event" of the current record in the sorted learning history table is a click of the "Mentor Call" button (S218, Yes). For the other case (S218, No), the learning server machine 10 finishes the process with respect to the current record in the sorted learning history table without executing a process in S219.

The learning server machine 10 finishes the second loop process L2 and starts the first loop process L1 for the next record in the sorted learning management table after the server finishes the processes for the respective records corresponding to the current learning management number (the learning management number of the current record in the sorted learning management table). When the process for all the records in the sorted learning management table is finished, the learning server machine 10 finishes the first loop process L1.

The learning server machine 10 divides the number V2 of learners who click the "Not Understood" button, the number V3 of learners who click the "Mentor Call" button, the number V4 of learners who click the "Next" button and the number V5 of learners who click the "Understood" button by the number V1, respectively, to calculate a click ratio of the "Not Understood" button, a click ratio of the "Mentor Call" button, a click ratio of the "Next" button and a click ratio of the "Understood" button (FIG. 10, S220).

Next, the learning server machine 10 divides the number V2a of achievers who click the "Not Understood" button by the number V2b of finishers who click the "Not Understood" button to calculate the ratio of the achievers in the finishers who click the "Not Understood" button (S221). Furthermore, the learning server machine 10 divides the number V3a of achievers who click the "Mentor Call" button by the number V3b of achievers who click the "Mentor Call" button to calculate the ratio of the achievers in the finishers who click the "Mentor Call" button (S222).

After that, the learning server machine 10 creates status information (S223) based on the calculated results of S220 through S222. That is, the status information created by the learning server machine 10 includes a circle graph 31 (FIG. 6) that represents the click ratio calculated in S220 and bar graphs 32, 33 that represent the ratio of the achievers in the finishers who click the "Not Understood" button (S221) and the ratio of the achievers in the finishers who click the "Mentor Call" button (S222), respectively. The process of the flowcharts shown in FIGS. 8 through 10 is finished by creating the status information. That is, the process of S2 in FIG. 7 is finished.

Next, the learning server machine 10 acquires the learning material entity corresponding to the learning material unit to be attended by the current learner from the "Learning Material Entity" field of the learning material DB 13 and creates Web data, which includes the learning material entity as a learning material part 30 (FIG. 6) and the status information (the circle graph 31 and the bar graphs 32, 33) created in S2 of FIG. 7. Then, the server machine 10 transmits the Web data to the client machine 20 of the current learner (S3).

Then the client machine 20 receives the Web data transmitted in S3 and displays it as an Web page (S4). As shown in FIG. 6, the Web page includes the learning material part 30 and the status information (the graphs 31 to 33).

A learner studies with the learning material part 30 in the Web page and clicks one of the "Understood" button, the "Not Understood" button, the "Mentor Call" button and the "Next" button displayed on the Web page according to intelligibility for the contents. That is, a learner clicks the "Understood" button shown in FIG. 6 when he or she understood the contents. On the other hand, when a learner could not understand the contents, he or she can click the "Not Understood" button to require a display of commentaries corresponding to the contents. The learner can click the "Mentor Call" button instead of clicking the "Not Understood" button to consult a mentor directly. Further the learner can click the "Next" button to go on learning of the next learning material unit without reporting the intelligibility.

When any one of these buttons is clicked, the client machine 20 detects an event caused by a click of button and transmits response information representing the event to the learning server machine 10 (S5). Then the device 20 finishes its own process.

The learning server machine 10 receives information transmitted in S5 and creates a record including the event (the history of button clicks) based on the information. The created record is added to the learning history DB 16 (S6) and the server machine 10 finishes its own process.

As described above, since a learner can have a knowledge of intelligibility or the achievement status of other learners who attend the same learning material unit, the learner can study with recognition of surrounding circumstance without loneliness as well as a classroom education. Furthermore, when a learner cannot understand the contents of the learning material unit, he or she can decide whether he or she should continue the learning to understand the contents of the learning material or he or she should give up according to the status information about other learners such as intelligibility or achievement status. In other words, when a ratio of the achiever who could not understand the contents of the current learning material unit is high, a learner can determine that he or she should continue learning. On the other hand, when a ratio of the achiever who could not understand the contents of the current learning material unit is low, a learner can determine that he or she should give up. A learner can stop the learning of the current learning course at early time and can change to another course that matches one's level. Furthermore, a learner can ask appropriate questions based on status information. This improves efficiency of learning of a learner and repeat rate.

According to the learning support method of the present invention constituted as above, a learner can grasp the situations of other learners with respect to the current learning contents. Accordingly a learner can continue learning efficiently and comfortably.

What is claimed is:

1. A learning support method with an on-line computer that holds learning material contents including a plurality of learning pages, a learning history of said learning material contents and intelligibility information corresponding to said respective learning pages, comprising:

transmitting one learning page of said learning material contents to client machines:

updating said intelligibility information when said on-line computer receives an intelligibility declaration with respect to the learning page of said learning material contents transmitted from one of said client machines; and transmitting the intelligibility declarations of all learners for first through recent pages transmitted according to said updated intelligibility information and said learning history so that a learner has a knowledge of intelligibility status of other learners who attend the same learning material content;

wherein said on-line computer transmits a ratio of the number of learners who cannot understand said learning material content to the number of learners who completed said learning material content in said transmitting the intelligibility declarations by all learners, said ratio being calculated based on said updated intelligibility information and said learning history.

2. A computer-readable storage storing a learning support program for controlling an on-line computer to execute processes of:

storing learning material contents including a plurality of learning pages in a storage;

storing a learning history of said learning material contents in said storage;

storing intelligibility information corresponding to said respective learning pages stored in said storage;

transmitting one of said learning pages stored to client machines;

updating said intelligibility information corresponding to the learning page when said on-line computer receives an intelligibility declaration with respect to the learning page of said learning material contents transmitted from one of said client machines; and transmitting said intelligibility declarations of all learners for first through recent pages transmitted according to said undated intelligibility information and said learning history stored so that a learner has a knowledge of intelligibility status of other learners who attend the same learning material content;

wherein said intelligibility declarations by the learners represent that the learners cannot understand said learning material content; and wherein said on-line computer transmits a ratio of the number of learners who cannot understand said learning material content to the number of learners who completed said learning material content.

3. A learning support method, comprising:

receiving intelligibility declarations of a plurality of learners about learning material content;

updating intelligibility information based on the intelligibility declarations received; and transmitting said updated intelligibility information to a plurality of client machines so that a learner has a knowledge of intelligibility status of other learners who attend the same learning material content;

further comprising calculating and transmitting a ratio of the number of learners who cannot understand said learning material content to the number of learners who completed said learning material content.

* * * * *

UNITED STATES PATENT AND TRADEMARK OFFICE
CERTIFICATE OF CORRECTION

| | |
|---|---|
| PATENT NO. | : 7,333,769 B2 |
| APPLICATION NO. | : 10/282131 |
| DATED | : February 19, 2008 |
| INVENTOR(S) | : Shunichi Kamikawa et al. |

Page 1 of 1

It is certified that error appears in the above-identified patent and that said Letters Patent is hereby corrected as shown below:

Column 9, Line 4, change "machines:" to --machines;--.

Column 10, Line 8, change "undated" to --updated--.

Signed and Sealed this

Second Day of September, 2008

JON W. DUDAS
*Director of the United States Patent and Trademark Office*